(12) United States Patent
Puthoor et al.

(10) Patent No.: US 12,099,867 B2
(45) Date of Patent: Sep. 24, 2024

(54) MULTI-KERNEL WAVEFRONT SCHEDULER

(71) Applicant: Advanced Micro Devices, Inc., Santa Clara, CA (US)

(72) Inventors: Sooraj Puthoor, Austin, TX (US); Joseph Gross, Austin, TX (US); Xulong Tang, State College, PA (US); Bradford Michael Beckmann, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/993,061

(22) Filed: May 30, 2018

(65) Prior Publication Data

US 2019/0370059 A1  Dec. 5, 2019

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC .... G06F 9/4881; G06F 9/5038; G06F 9/5027; G06F 9/505; G06F 9/5083; G06F 9/5088; G06F 2209/485
See application file for complete search history.

(56) References Cited

U.S. PATENT DOCUMENTS

| | | | | |
|---|---|---|---|---|
| 5,900,025 A | * | 5/1999 | Sollars | G06F 9/462 712/248 |
| 6,697,932 B1 | * | 2/2004 | Yoaz | G06F 9/3861 712/216 |

(Continued)

FOREIGN PATENT DOCUMENTS

| | | | | |
|---|---|---|---|---|
| CN | 101753546 A | * | 6/2010 | |
| CN | 104036001 A | * | 9/2014 | ....... G06F 17/30303 |

(Continued)

OTHER PUBLICATIONS

Wang et al., "Exploiting Concurrent Kernel Execution on Graphic Processing Units", International Conference on High Performance Computing and Simulation, Aug. 2011, pp. 24-32.

(Continued)

*Primary Examiner* — Emerson C Puente
*Assistant Examiner* — Zhi Chen
(74) *Attorney, Agent, or Firm* — Kowert, Hood, Munyon, Rankin & Goetzel, P.C.; Rory D. Rankin (57) ABSTRACT

Systems, apparatuses, and methods for implementing a multi-kernel wavefront scheduler are disclosed. A system includes at least a parallel processor coupled to one or more memories, wherein the parallel processor includes a command processor and a plurality of compute units. The command processor launches multiple kernels for execution on the compute units. Each compute unit includes a multi-level scheduler for scheduling wavefronts from multiple kernels for execution on its execution units. A first level scheduler creates scheduling groups by grouping together wavefronts based on the priority of their kernels. Accordingly, wavefronts from kernels with the same priority are grouped together in the same scheduling group by the first level scheduler. Next, the first level scheduler selects, from a plurality of scheduling groups, the highest priority scheduling group for execution. Then, a second level scheduler schedules wavefronts for execution from the scheduling group selected by the first level scheduler.

20 Claims, 8 Drawing Sheets

(56) References Cited

U.S. PATENT DOCUMENTS

| | | | |
|---|---|---|---|
| 7,761,697 | B1 | 7/2010 | Coon et al. |
| 8,151,095 | B1 | 4/2012 | Wilt |
| 8,812,752 | B1* | 8/2014 | Shih .......... G06F 9/542 717/109 |
| 9,804,666 | B2 | 10/2017 | Jiao |
| 2002/0073129 | A1* | 6/2002 | Wang .......... G06F 9/4881 718/102 |
| 2003/0065809 | A1* | 4/2003 | Byron .......... H04L 47/50 709/232 |
| 2006/0149941 | A1 | 7/2006 | Colavin et al. |
| 2006/0190943 | A1* | 8/2006 | Haeri .......... G06F 9/4887 718/103 |
| 2011/0219221 | A1 | 9/2011 | Skadron et al. |
| 2011/0302372 | A1* | 12/2011 | Fontenot .......... G06F 9/3851 711/122 |
| 2012/0089792 | A1 | 4/2012 | Fahs et al. |
| 2013/0042090 | A1 | 2/2013 | Krashinsky |
| 2013/0091340 | A1 | 4/2013 | Abdallah |
| 2013/0117541 | A1 | 5/2013 | Choquette et al. |
| 2013/0155080 | A1* | 6/2013 | Nordlund .......... G06T 15/005 345/522 |
| 2013/0212364 | A1 | 8/2013 | Fetterman et al. |
| 2013/0226535 | A1* | 8/2013 | Tuan .......... G06F 30/367 703/2 |
| 2013/0332702 | A1* | 12/2013 | Boudier .......... G06F 9/3885 712/28 |
| 2014/0164737 | A1 | 6/2014 | Collange et al. |
| 2014/0204103 | A1 | 7/2014 | Beer-gingold et al. |
| 2014/0215187 | A1 | 7/2014 | Yazdani |
| 2014/0259016 | A1 | 9/2014 | Lottes et al. |
| 2014/0337389 | A1 | 11/2014 | Ricketts et al. |
| 2015/0135183 | A1 | 5/2015 | Kipp |
| 2015/0200867 | A1* | 7/2015 | Dutta .......... H04L 49/3045 709/226 |
| 2015/0208275 | A1* | 7/2015 | Kakadia .......... H04W 28/24 370/230 |
| 2015/0212794 | A1* | 7/2015 | Otenko .......... G06F 9/52 710/109 |
| 2015/0220346 | A1 | 8/2015 | Wang et al. |
| 2016/0055005 | A1* | 2/2016 | Hsu .......... G06F 9/3887 712/22 |
| 2016/0085551 | A1 | 3/2016 | Greathouse et al. |
| 2016/0103715 | A1 | 4/2016 | Sethia et al. |
| 2016/0349832 | A1 | 12/2016 | Jiao et al. |
| 2016/0371082 | A1* | 12/2016 | Yudanov .......... G06F 9/461 |
| 2017/0053374 | A1* | 2/2017 | Howes .......... G06T 1/60 |
| 2017/0075734 | A1 | 3/2017 | Raman |
| 2017/0221173 | A1* | 8/2017 | Acharya .......... G06F 9/4843 |
| 2017/0278213 | A1 | 9/2017 | Eckert et al. |
| 2018/0046474 | A1* | 2/2018 | Wang .......... G06F 9/44521 |
| 2018/0046577 | A1 | 2/2018 | Chen et al. |
| 2018/0108109 | A1 | 4/2018 | Zhan et al. |
| 2018/0165786 | A1* | 6/2018 | Bourd .......... G06T 15/005 |
| 2018/0239606 | A1 | 8/2018 | Mantor et al. |
| 2018/0276046 | A1* | 9/2018 | Joao .......... G06F 9/4881 |
| 2018/0349145 | A1 | 12/2018 | Tye et al. |
| 2019/0102224 | A1* | 4/2019 | Bernat .......... G06F 9/4887 |
| 2019/0258635 | A1* | 8/2019 | Pal .......... G06F 16/2272 |

FOREIGN PATENT DOCUMENTS

| | | |
|---|---|---|
| CN | 106325996 A | 1/2017 |
| JP | 2010134929 A | 6/2010 |
| JP | 2014106715 A | 6/2014 |
| JP | 2016532180 A | 10/2016 |
| KR | 1020110019776 A | 2/2011 |

OTHER PUBLICATIONS

European Search Report in European Application No. 17159105.0, mailed Sep. 19, 2017, 4 pages.

Communication pursuant to Article 94(3) EPC in European Application No. 17159105.0, mailed Nov. 21, 2017, 10 pages.

Communication pursuant to Article 94(3) EPC in European Application No. 17159105.0, mailed Jul. 2, 2018, 7 pages.

Meng et al., "Dynamic Warp Subdivision for Integrated Branch and Memory Divergence Tolerance", Proceedings of the 37th Annual International Symposium on Computer Architecture, Jun. 19, 2010, pp. 235-246.

Brunie et al., "Simultaneous Branch and Warp Interweaving for Sustained GPU Performance", Jun. 11, 2012, 36 pages.

Volkov, Vasily, "Understanding Latency Hiding on GPUs", Technical Report No. UCB/EECS-2016-143, Aug. 12, 2016, 128 pages, https://www2.eecs.berkeley.edu/Pubs/TechRpts/2016/EECS-2016-143.pdf.

International Search Report and Written Opinion in International Application No. PCT/US2018/019026, mailed May 7, 2018, 9 pages.

International Search Report and Written Opinion in International Application No. PCT/US2018/034601, mailed Sep. 5, 2018, 12 pages.

Non-Final Office Action in U.S. Appl. No. 15/607,991, mailed Apr. 2, 2019, 10 pages.

Non-Final Office Action in U.S. Appl. No. 15/439,540, mailed Oct. 5, 2018, 12 pages.

Final Office Action in U.S. Appl. No. 15/439,540, mailed May 1, 2019, 9 pages.

Liu et al., "SAWS: Synchronization Aware GPGPU Warp Scheduling for Multiple Independent Warp Schedulers", 48th Annual IEEE/ACM International Symposium on Microarchitecture, Dec. 5, 2015, pp. 383-394.

Brunie et al., "Simultaneous Branch and Warp Interweaving for Sustained GPU Performance", Proceedings of the 39th Annual International Symposium on Computer Architecture, Jun. 9, 2012, pp. 49-60, https://hal-ens-lyon.archives-ouvertes.fr/ensl-00649650/file/sbiswi.pdf. [Retrieved May 17, 2018].

Fung et al. "Dynamic Warp Formation and Scheduling for Efficient GPU Control Flow", Proceedings of the 40th Annual IEEE/ACM International Symposium on Microarchitecture, Dec. 1, 2007, 12 pages, https://www.ece.ubc.ca/~aamodt/papers/wwlfung.micro2007.pdf. [Retrieved May 17, 2018].

Ino et al., "Cooperative Multitasking for GPU-Accelerated Grid Systems", Concurrency and Computation: Practice and Experience, Jan. 2012, pp. 96-107, vol. 24, Issue 1, https://pdfs.semanticscholar.org/6d21/d8bb5419e94c9dfd85c1619b21ec65f93914.pdf. [Retrieved May 17, 2018].

Jog et al., "OWL: Cooperative Thread Array Aware Scheduling Techniques for Improving GPGPU Performance", Proceedings of the 18th International Conference on Architectural Support for Programming Languages and Operating Systems, Mar. 16, 2013, pp. 395-406, http://www.danielwong.org/classes/_media/ee260_w17/owl.pdf. [Retrieved May 17, 2018].

Kulkarni et al., "Scheduling Strategies for Optimistic Parallel Execution of Irregular Programs", Proceedings of the 20th Annual Symposium on Parallelism in Algorithms and Architectures, Jun. 1, 2008, pp. 217-228, https://www.cs.cornell.edu/~kb/publications/SPAA08.pdf. [Retrieved May 17, 2018].

Lee et al., "CAWS: Criticality-Aware Warp Scheduling for GPGPU Workloads", Proceedings of the 23rd International Conference on Parallel Architectures and Compilation, Aug. 24, 2014, pp. 175-186, http://faculty.engineering.asu.edu/carolewu/wp-content/uploads/2012/12/PACT14_CAWS_Lee_final.pdf. [Retrieved May 17, 2018].

"Multi-Process Service", NVIDIA Corporation, Oct. 2017, 28 pages, https://docs.nvidia.com/deploy/pdf/CUDA_Multi_Process_Service_Overview.pdf. [Retrieved May 17, 2018].

Narasiman et al., "Improving GPU Performance Via Large Warps and Two-Level Warp Scheduling", Proceedings of the 44th Annual IEEE/ACM International Symposium on Microarchitecture, Dec. 3, 2011, pp. 308-317, https://users.ece.cmu.edu/~omutlu/pub/large-gpu-warps_micro11.pdf. [Retrieved May 17, 2018].

Park et al., "Chimera: Collaborative Preemption for Multitasking on a Shared GPU", Proceedings of the 20th International Conference on Architectural Support for Programming Languages and Operating Systems, Mar. 14, 2015, pp. 593-606, http://cccp.eecs.umich.edu/papers/jasonjk-asplos15.pdf. [Retrieved May 17, 2018].

(56) References Cited

OTHER PUBLICATIONS

Rogers et al., "Cache-Conscious Wavefront Scheduling", Proceedings of the 45th Annual IEEE/ACM International Symposium on Microarchitecture, Dec. 1, 2012, 12 pages, https://www.ece.ubc.ca/~aamodt/papers/tgrogers.micro2012.pdf. [Retrieved May 17, 2018].

Rogers et al., "Divergence-Aware Warp Scheduling", Proceedings of the 46th Annual IEEE/ACM International Symposium on Microarchitecture, Dec. 7, 2013, pp. 99-110, https://www.ece.ubc.ca/~aamodt/papers/tgrogers.micro2013.pdf. [Retrieved May 17, 2018].

Final Office Action in U.S. Appl. No. 15/607,991, mailed Sep. 3, 2019, 6 pages.

International Search Report and Written Opinion in International Application No. PCT/US2019/024354, mailed Jun. 25, 2019, 13 pages.

Lee et al., "Improving GPGPU resource utilization through alternative thread block scheduling", 2014 IEEE 20th International Symposium on High Performance Computer Architecture (HPCA), Feb. 15, 2014, pp. 268-271.

Yoon et al., "Dynamic Resizing on Active Warps Scheduler to Hide Operation Stalls on GPUs", IEEE Transactions on Parallel and Distributed Systems, Nov. 2017, pp. 3142-3156, vol. 28, No. 11.

Yu et al., "A Stall-Aware Warp Scheduling for Dynamically Optimizing Thread-level Parallelism in GPGPUs", Proceedings of the 29th ACM on International Conference on Supercomputing, Jun. 8, 2015, pp. 15-24.

Rogers et al., "Cache-Conscious Wavefront Scheduling", Proceedings of the 2012 45th Annual IEEE/ACM International Symposium on Microarchitecture, Dec. 1, 2012, 12 pages.

Decision to grant in Japanese Application No. 2019-545963, mailed Dec. 21, 2021, 5 pages.

First Examination Report in Indian Patent Application No. 201917026060, mailed Dec. 30, 2021, 6 pages.

First Examination Report in Indian Patent Application No. 201917049753, mailed Jan. 26, 2022, 6 pages.

Communication pursuant to Article 94(3) EPC in European Application No. 18733406.5, mailed Jun. 30, 2021, 8 pages.

Non-Final Office Action in U.S. Appl. No. 16/846,654, mailed Mar. 21, 2022, 11 pages.

Office Action in Korean Patent Application No. 10-2019-7019496, mailed Apr. 26, 2022, 9 pages.

First Examination Report in Indian Patent Application No. 202017051553, mailed Feb. 18, 2022, 6 pages.

Communication pursuant to Article 94(3) EPC in European Patent Application No. 19717060.8, mailed Dec. 15, 2022, 11 pages.

Gong et al., "TwinKernels: An Execution Model to Improve GPU Hardware Scheduling at Compile Time", CGO '17: Proceedings of the 2017 International Symposium on Code Generation and Optimization, Feb. 2017, pp. 39-49.

Notice of Allowance in Korean Patent Application No. 10-2019-7019496, mailed Oct. 31, 2022, 3 pages.

"Improving GPGPU Resource Utilization Through Alternative Thread Block Scheduling" IEEE 20th International Symposium on High Performance Computer Architecture, which is the appendix 1 Minseok Lee extrinsic 6 Feb. 15, 2014, and the pp. 1-12.

Notice of Allowance in Korean Patent Application No. 10-2020-703427, mailed Jul. 17, 2023, 4 pages.

Summons to attend oral proceedings pursuant to Rule 115(1) EPC, for European Patent Application No. 18717060.8 dated Sep. 26, 2023.

Narasiman Veynu et al. "Improving GPU performance via large warps and two-level warp scheduling", 2011 44th Annual IEEE/ACM International Symposium on Microarchitecture (MICRO), ACM, Dec. 2, 2011, pp. 308-317.

Office Action in Chinese Patent Application No. 201980036426.3, date mailed May 31, 2024, with translation, 12 pgs.

\* cited by examiner

MULTI-KERNEL WAVEFRONT SCHEDULER

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

Modern processors (e.g., graphics processing units (GPUs)) include structures that support running multiple processes concurrently, with each process potentially launching multiple kernels. As a result, multiple kernels from multiple processes can run simultaneously on the same processor. As used herein, a "kernel" is one or more executable program instructions. Typically, such a kernel is identified as a function and when operating upon multiple data elements multiple instances of the kernel are executed in parallel. Each such instance is referred to as a "thread" of execution. A group of such threads is also referred to herein as a "warp" or "wavefront". Typically, a GPU kernel has multiple warps or wavefronts. Running multiple kernels concurrently from a single process or from multiple processes leads to these kernels competing for the shared resources of the processor. In such a scenario, the interference from multiple kernels seeking access to these shared resources can reduce overall performance. Further, the contention of shared resources can be worse when concurrently running different kernels because unlike workgroups from the same kernel workgroups from different kernels are completely different entities that have no commonality.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a multi-kernel wavefront scheduler are disclosed herein. A system includes at least a processor with a plurality of compute units coupled to one or more memories. In some implementations, the system includes multiple processors. For example, in one implementation, the system includes a central processing unit (CPU) and a graphics processing unit (GPU). In other implementations, the system includes other numbers and/or types of processors. In describing various implementations, the CPU is referred to herein as a first processor and the GPU is referred to herein as a second processor. The first processor is implemented with any type of processor depending on the implementation. Additionally, the second processor is implemented with any type of processor depending on the implementation.

In one implementation, multiple processes are running on the first processor, and each process potentially invokes one or more kernels to be executed on the second processor. The kernels that get invoked on the second processor typically include multiple wavefronts. In one implementation, the second processor includes a command processor and a plurality of compute units. The command processor launches kernels on the various compute units of the second processor. In one implementation, each compute unit includes a multi-level scheduler to schedule wavefronts of kernels that are launched and running on the compute unit. The multi-level scheduler schedules wavefronts in a way that helps to reduce resource contention among a plurality of kernels running on the compute unit while also ensuring forward progress of wavefront execution.

In one implementation, a first level scheduler groups together wavefronts into scheduling groups based on the priority of the kernel of the wavefronts. For example, for kernels of a first priority, all wavefronts of these kernels are grouped together into a first scheduling group. For kernels of a second priority, all wavefronts of these kernels are grouped together into a second scheduling group. For kernels of a third priority, all wavefronts of these kernels are grouped together into a third scheduling group, and so on. Then the first level scheduler selects, from a plurality of scheduling groups, the highest priority scheduling group for scheduling. Next, the second level scheduler schedules wavefronts from the scheduling group selected by the first level scheduler. Depending on the implementation, the second level scheduler uses a round-robin policy, an oldest wavefront first policy, or another policy for selecting which wavefronts to schedule from the scheduling group selected by the first level scheduler.

In one implementation, each compute unit includes control logic for monitoring one or more conditions indicative of resource utilization on the compute unit. The control logic generates a measure of resource contention based on the one or more conditions being monitored. If the measure of resource contention is greater than a first threshold, then the scheduler moves the lowest priority scheduling group into a descheduled queue to prevent this group from being scheduled for execution. Then, the control logic waits for a predetermined amount of time before generating a subsequent measure of resource contention. If the subsequent measure is still greater than the first threshold, then the scheduler moves the next lowest priority scheduling group into the descheduled queue. However, if the subsequent measure of resource contention is less than a second threshold, then the scheduler moves the highest priority scheduling group out of the descheduled queue to allow this group to be scheduled for execution. The control logic and scheduler continue this pattern of operations of monitoring conditions, waiting a predetermined amount of time, and then determining whether to migrate scheduling groups between queues based on a comparison of the measure of resource contention to one or more thresholds.

Figure 1:
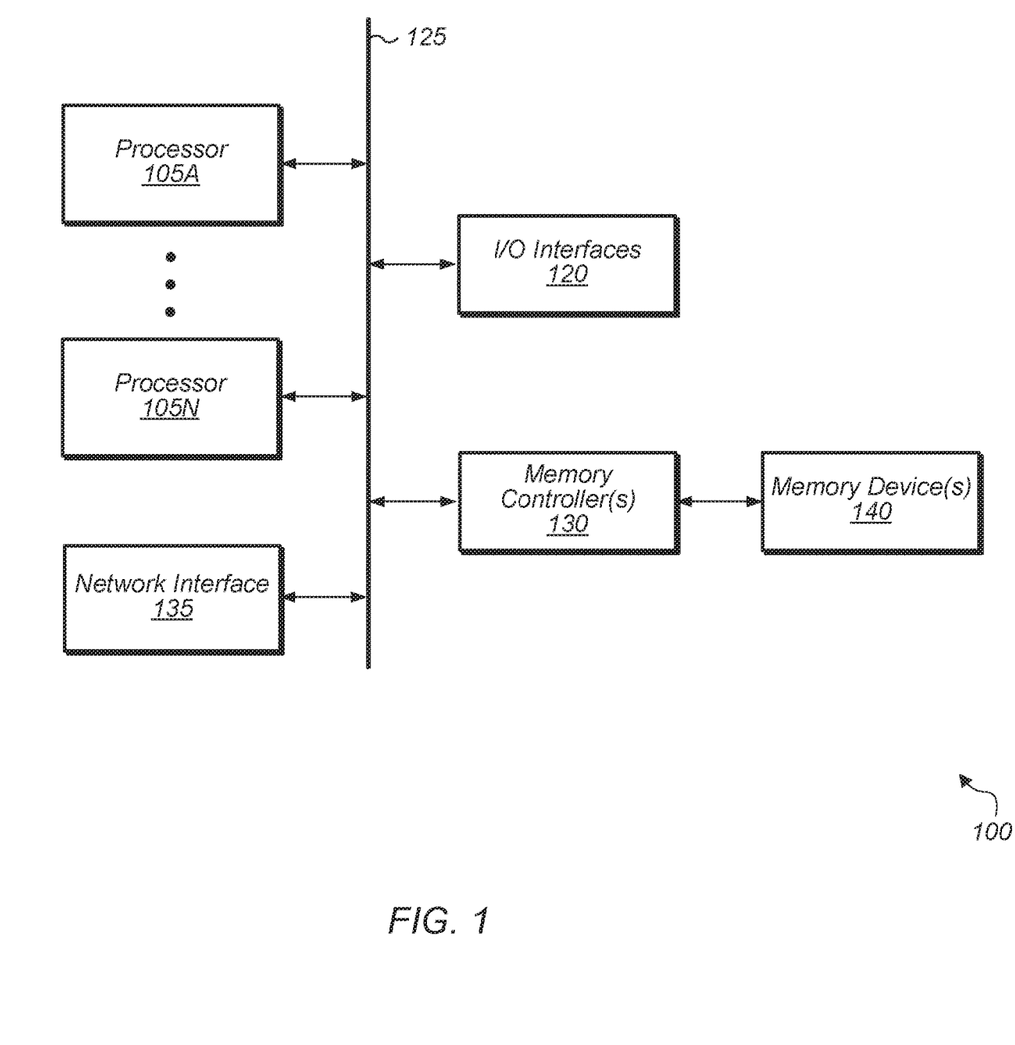
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, one or more of processors 105A-N include a plurality of compute units. Each compute unit includes a multi-level scheduler for scheduling wavefronts from multiple kernels for execution in a way that reduces resource contention on the compute unit. Each compute unit also monitors resource contention and throttles scheduling groups of wavefronts if a measure of the monitored resource contention is greater than a threshold.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
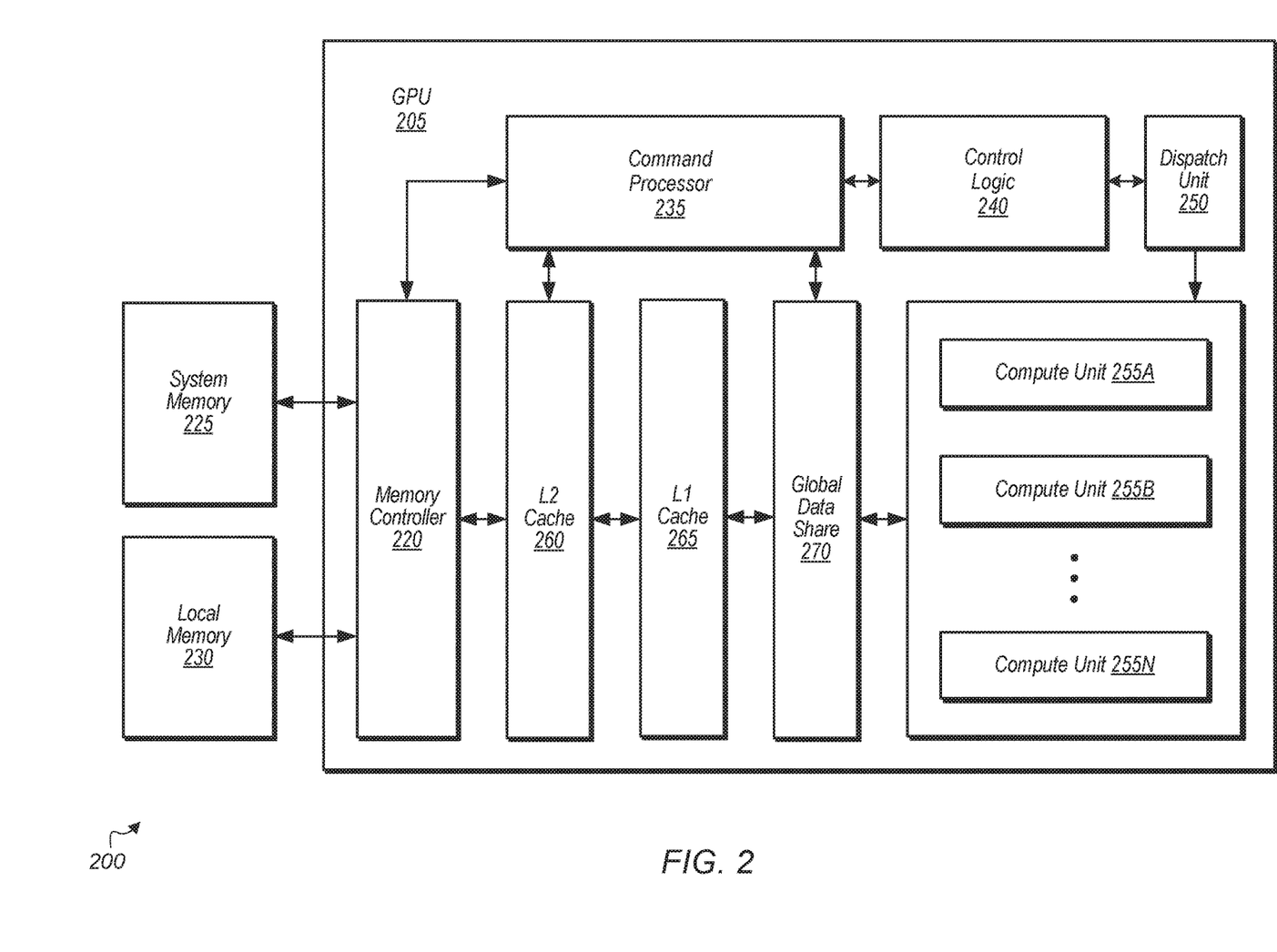
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners.

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to dispatch kernels to compute units 255A-N. Control logic 240 monitors the various resources of GPU 205 and helps dispatch unit 250 determine how to dispatch wavefronts to compute units 255A-N based on resource utilization. Threads within kernels executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
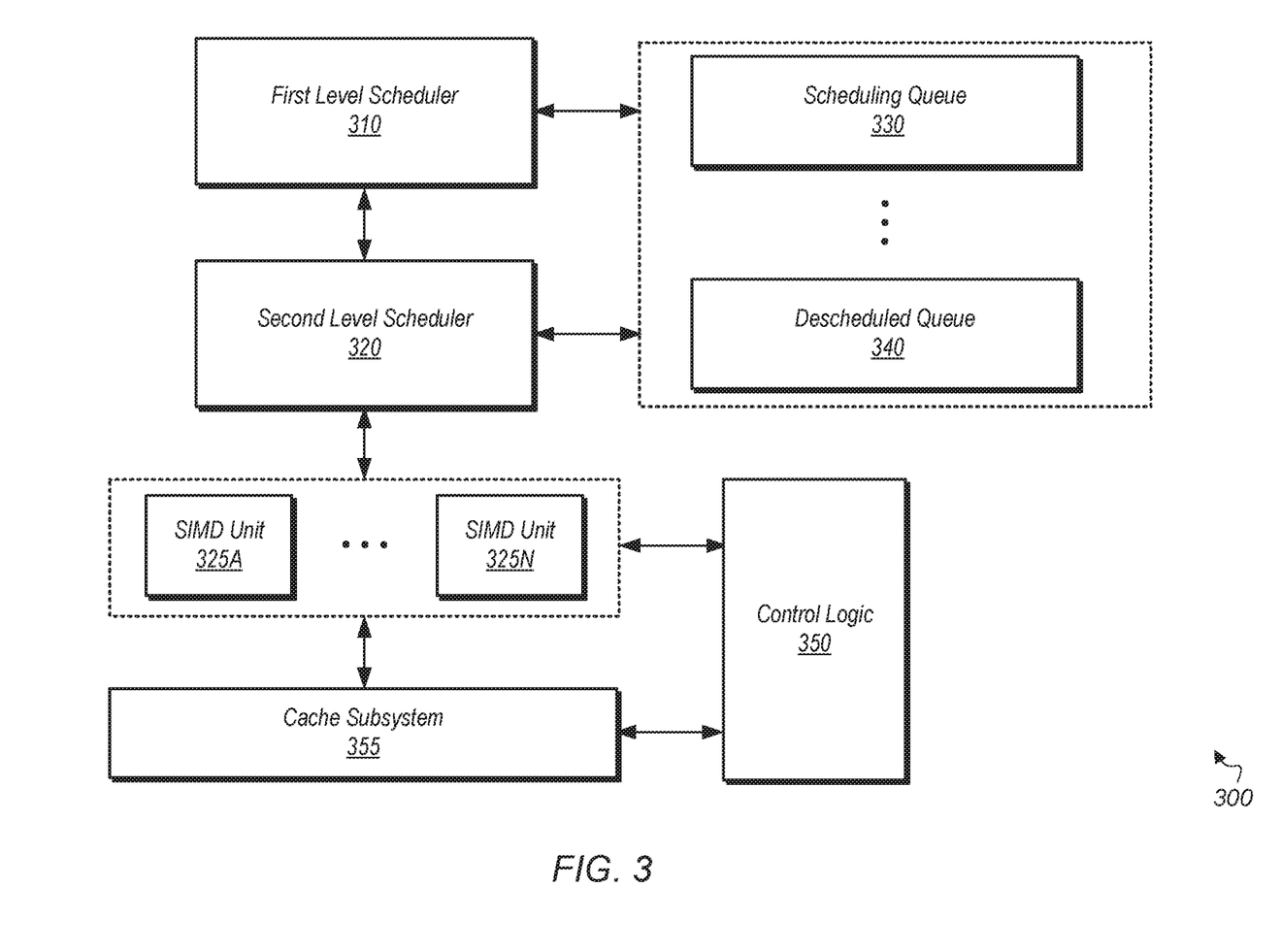
FIG. 3 is a block diagram of one implementation of a compute unit.

Referring now to FIG. 3, a block diagram of one implementation of a compute unit 300 is shown. In one implementation, compute unit 300 includes first level scheduler 310, second level scheduler 320, single instruction, multiple data (SIMD) units 325A-N, scheduling queue 330, descheduled queue 340, control logic 350, and cache subsystem 355. First level scheduler 310 and second level scheduler 320 are used to implement a two-level scheduling scheme for wavefronts of multiple kernels that helps to reduce resource contention on compute unit 300.

In other implementations, compute unit 300 includes other components and/or is arranged differently. SIMD units 325A-N are representative of any number of SIMD units for executing wavefronts. Scheduling queue 330 is representative of any number of queues for storing scheduling groups of wavefronts which are able to be scheduled on SIMD units 325A-N. Descheduled queue 340 is representative of any number of queues for storing scheduling groups which are not allowed to be scheduled on SIMD units 325A-N. It is noted that compute unit 300 also includes other components which are not shown to avoid obscuring the figure.

In one implementation, first level scheduler 310 groups together wavefronts into scheduling groups based on the priority of the kernel of the wavefronts. For example, for kernels of a first priority, all wavefronts of these kernels are grouped together into a first scheduling group. For kernels of a second priority, all wavefronts of these kernels are grouped together into a second scheduling group, and so on. Then, first level scheduler 310 selects, from a plurality of scheduling groups, the highest priority scheduling group for scheduling. Next, second level scheduler 320 schedules wavefronts from the scheduling group selected by first level scheduler 310. Depending on the implementation, second level scheduler 320 uses a round-robin policy, an oldest wavefront first policy, or another policy for selecting which wavefronts to schedule from the scheduling group selected by first level scheduler 310. In another implementation, if priority information is not available, then first level scheduler 310 groups together wavefronts from the same kernel into the same scheduling group. Then, first level scheduler 310 selects the scheduling group corresponding to the oldest kernel.

In one implementation, compute unit 300 includes control logic 350 for monitoring one or more conditions indicative of resource utilization on compute unit 300. In various implementations, the conditions being monitored include compute unit stall cycles, cache miss rates, memory access latency, link utilization, and/or other conditions. Control logic 350 generates a measure of resource contention based on the one or more conditions being monitored. If the measure of resource contention is greater than a first threshold, then control logic 350 moves the lowest priority scheduling group from scheduling queue 330 into descheduled queue 340 to prevent this group from being scheduled for execution. Then, control logic 350 waits for a predetermined amount of time before generating a subsequent measure of resource contention. If the subsequent measure is still greater than the first threshold, then the control logic 350 moves the next lowest priority scheduling group from scheduling queue 330 into descheduled queue 340. However, if the subsequent measure of resource contention is less than a second threshold, then control logic 350 moves the highest priority scheduling group out of descheduled queue 340 and back into scheduling queue 330 to allow this group to be scheduled for execution. Control logic 350 continues this pattern of operations of monitoring conditions, waiting a predetermined amount of time, and then determining whether to migrate scheduling groups between queues based on a comparison of the measure of resource contention to one or more thresholds.

Figure 4:
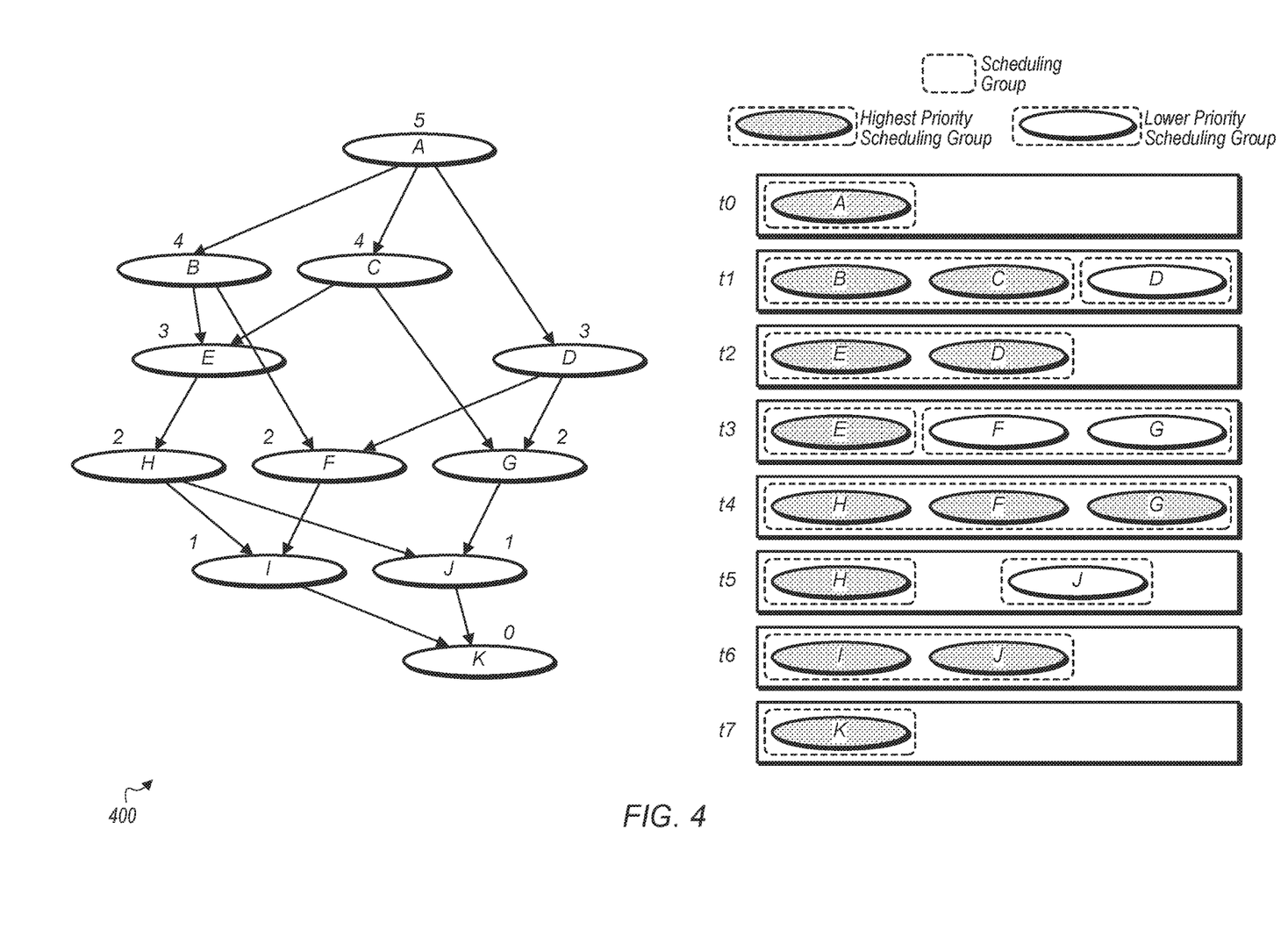
FIG. 4 is a block diagram of one implementation of wavefront scheduling for a given compute unit.

Turning now to FIG. 4, a block diagram of one implementation of wavefront scheduling for a given compute unit is shown. A given compute unit receives wavefronts of a plurality of kernels. In one implementation, a scheduler (not shown) groups together wavefronts into scheduling groups based on priority. For the purposes of this discussion, it is assumed that priority information is available to the scheduling logic of the given compute unit. In other implementations, other techniques for grouping wavefronts from multiple kernels into scheduling groups are used when priority information is not available. The left-side of diagram 400 illustrates the priorities of the different kernels that are being launched on the given compute unit in one particular scenario. Each kernel includes any number of wavefronts, with the number varying from kernel to kernel.

As shown in diagram 400, kernel A has a priority of 5, which is the highest priority of any kernel being dispatched to the given compute unit in this example scenario. Also as shown in diagram 400, kernels B and C have a priority of 4, kernels E and D have a priority of 3, kernels H, F, and G have a priority of 2, kernels I and J have a priority of 1, and kernel K has a priority of 0. The right-side of diagram 400 shows a timing diagram of when kernels are available to be executed on the given compute unit.

During time slot t0, kernel A is running on the given compute unit. Accordingly, the first-level scheduler will create a scheduling group with the wavefronts from kernel A and then the second-level scheduler will schedule wavefronts from this scheduling group to be executed on the given compute unit. During the next time slot t1, kernels B, C, and D are running on the given compute unit. The first-level scheduler creates a scheduling group for the wavefronts of kernels B and C since these kernels have the same priority. Since kernels B and C have a higher priority than kernel D, the first-level scheduler selects the scheduling group for kernels B and C for scheduling. The second-level scheduler will then select wavefronts from the scheduling group for kernels B and C to be executed during time slot t1. Since kernel D was not selected by the first-level scheduler, wavefronts from kernel D will not be executed during time slot t1.

During the next time slot t2, kernels E and D are running on the given compute unit. Wavefronts from kernel D is now able to be scheduled in time slot t2 since there are no higher priority kernels available in the same cycle. Accordingly, the first level scheduler creates a scheduling group for wavefronts from kernels E and D and the second level scheduler schedules wavefronts from this scheduling group to be executed on the compute unit during time slot t2. In time slot t3, there are still wavefronts from kernel E left to be scheduled and two new kernels F and G are running on the given compute unit. Since kernel E has a higher priority than kernels F and G, the first level scheduler selects the scheduling group corresponding to kernel E and the second level scheduler schedules wavefronts from this scheduling group to be executed on the compute unit during time slot t2.

During time slot t4, kernel H is now running on the given compute unit, as well as kernels F and G which were not completed in the previous time slot t3. Since all available kernels H, F, and G have the same priority (priority of 2), the first level scheduler creates a single scheduling group for kernels H, F, and G and the second level scheduler schedules wavefronts from kernels H, F, and G to be executed on the given compute unit during time slot t4. During time slot t5, there are still wavefronts from kernel H that were not able to be scheduling in time slot t4. Also, kernel J is now running on the given compute unit in time slot t5. Since kernel H has a higher priority than kernel J, the first level scheduler selects the scheduling group corresponding to kernel H and then the second level scheduler schedules wavefronts from kernel H to be executed on the given compute unit during time slot t5.

Then, in time slot t6, kernel I is now running on the compute unit as well as kernel J which was not selected in time slot t5. Since kernels I and J have the same priority, the first level scheduler creates a scheduling group for the wavefronts of kernels I and J, and the second level scheduler schedules wavefronts from kernels I and J to be executed on the compute unit during time slot t6. In time slot t7, kernel K is the only kernel running on the given compute unit. Accordingly, the first level scheduler creates a scheduling group for the wavefronts of kernel K and then the second level scheduler schedules wavefronts from kernel K to be executed on the given compute unit during time slot t7. It is noted that the pattern of scheduling decisions shown in diagram 400 are able to be continued for any subsequent time slots for additional kernels which are launched on the given compute unit.

Figure 5:
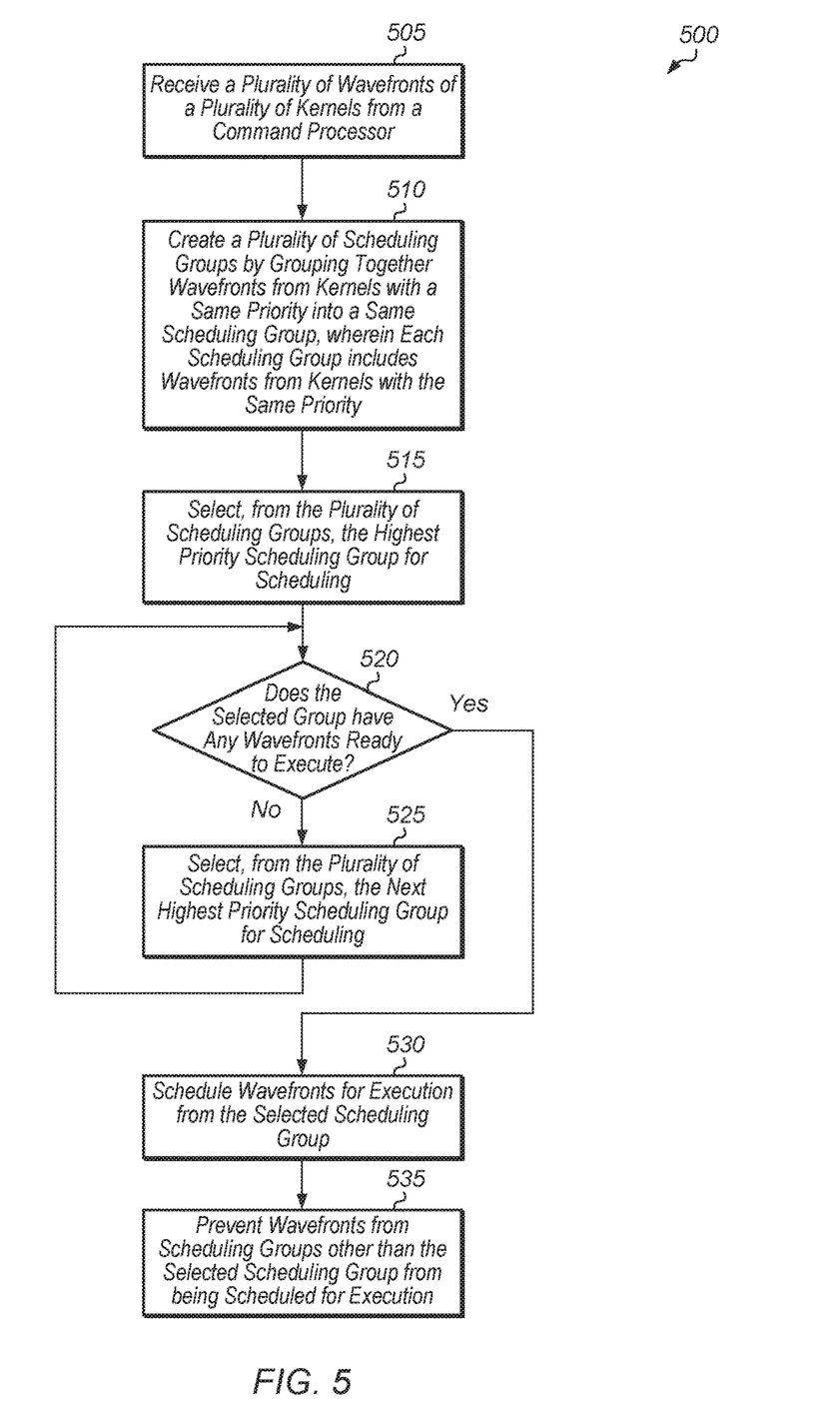
FIG. 5 is a generalized flow diagram illustrating one implementation of a method for scheduling wavefronts from multiple kernels for execution.
Figure 6:
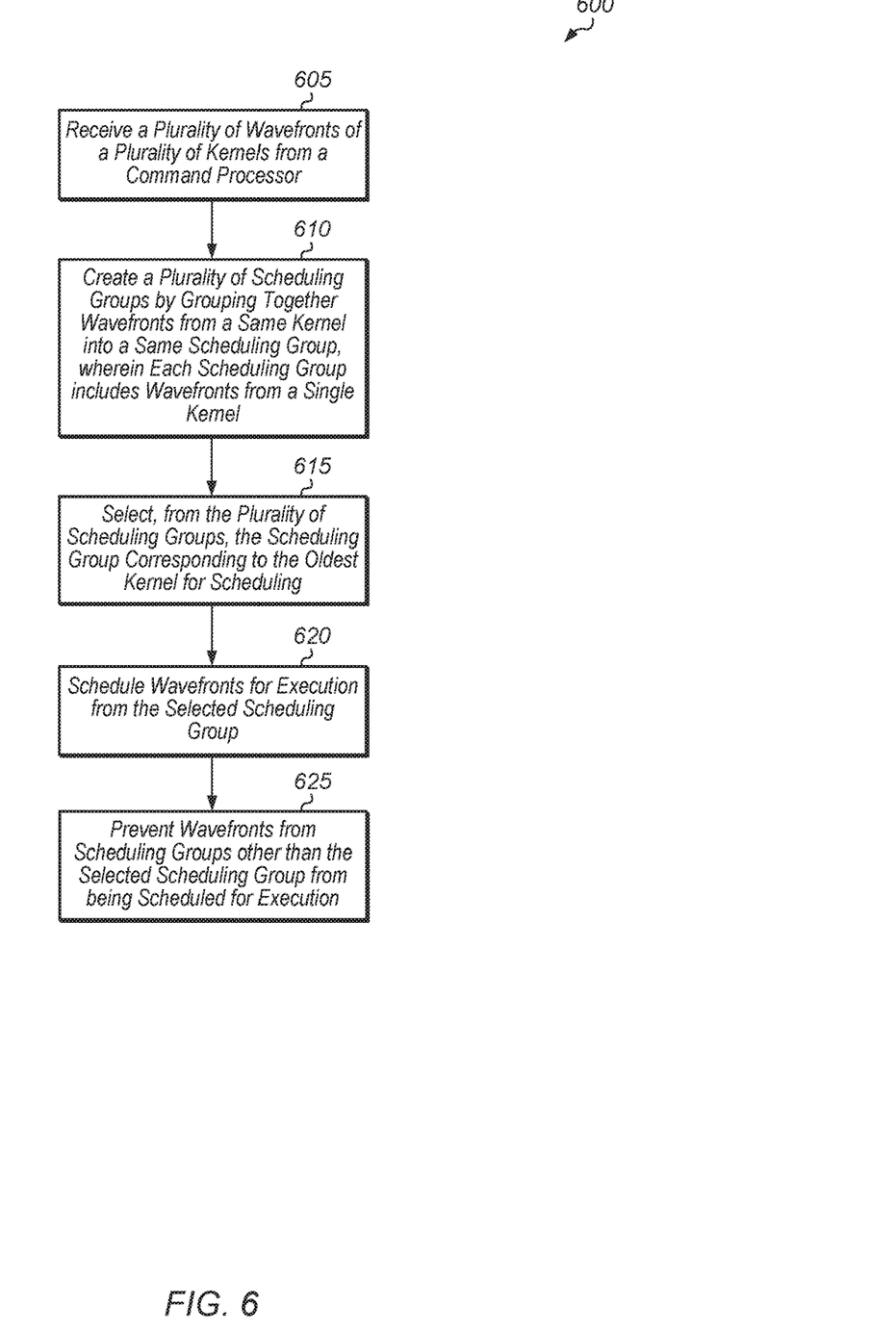
FIG. 6 is a generalized flow diagram illustrating one implementation of a method for scheduling workgroups from multiple kernels when priority information is not considered or not available.
Figure 7:
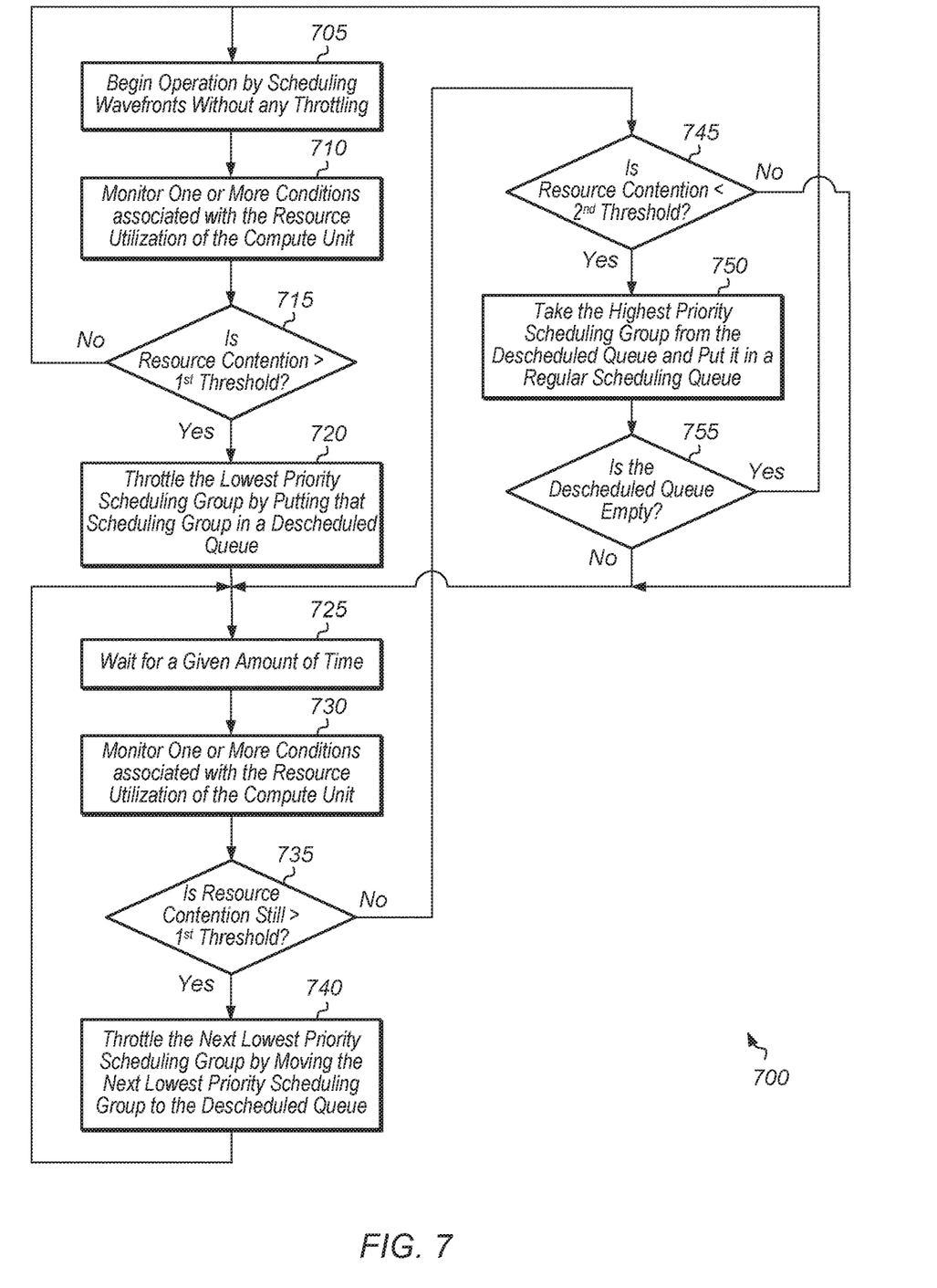
FIG. 7 is a generalized flow diagram illustrating one implementation of a method for dynamically throttling wavefront scheduling based on resource contention.

Referring now to FIG. 5, one implementation of a method 500 for scheduling wavefronts from multiple kernels for execution is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A wavefront scheduler receives a plurality of wavefronts of a plurality of kernels from a command processor (block 505). A first-level scheduler creates a plurality of scheduling groups by grouping together wavefronts from kernels with a same priority into a same scheduling group, wherein each scheduling group includes wavefronts from kernels with the same priority (block 510). Next, the first-level scheduler selects, from the plurality of scheduling groups, the highest priority scheduling group for scheduling (block 515). Then, the first-level scheduler determines if the selected scheduling group has any wavefronts ready to execute in the current cycle (conditional block 520). If the selected scheduling group does not have any wavefronts ready to execute in the current cycle (conditional block 520, "no" leg), then the first-level scheduler selects, from the plurality of scheduling groups, the next highest priority scheduling group for scheduling (block 525). After block 525, method 500 returns to conditional block 520. If the selected scheduling group has wavefronts ready to execute in the current cycle (conditional block 520, "yes" leg), then a second-level scheduler schedules wavefronts for execution from the scheduling-group selected by the first-level scheduler (block 530). Depending on the implementation, the second-level scheduler employs oldest kernel first scheduling, a round robin policy, or any other scheduling policy to schedule wavefronts from the scheduling-group selected by the first-level scheduler. Also, the second-level scheduler prevents wavefronts from scheduling groups other than the selected scheduling group from being scheduled for execution (block 535). After block 535, method 500 ends.

Referring now to FIG. 6, one implementation of a method 600 for scheduling workgroups from multiple kernels when priority information is not considered or not available is shown. A wavefront scheduler receives a plurality of wavefronts of a plurality of kernels from a command processor (block 605). Next, a first-level scheduler creates a plurality of scheduling groups by grouping together wavefronts from a same kernel into a same scheduling group, wherein each scheduling group includes wavefronts from a single kernel (block 610). Then, the first-level scheduler selects, from the plurality of scheduling groups, the scheduling group corresponding to the oldest kernel for scheduling (block 615). Next, a second-level scheduler schedules wavefronts for execution from the scheduling-group selected by the first-level scheduler (block 620). Also, the second-level scheduler prevents wavefronts from scheduling groups other than the selected scheduling group from being scheduled for execution (block 625). After block 625, method 600 ends.

Turning now to FIG. 7, one implementation of a method 700 for dynamically throttling wavefront scheduling based on resource contention is shown. A scheduler of a compute unit begins operation by scheduling wavefronts without any throttling (block 705). The scheduler monitors one or more conditions associated with the resource utilization of the compute unit (block 710). In various implementations, the conditions being monitored include compute unit stall cycles, cache miss rates, memory access latency, link utilization, and/or other conditions. If the one or more conditions indicate that resource contention has increased above a first threshold (conditional block 715, "yes" leg), then the scheduler throttles the lowest priority scheduling group and puts that scheduling group in a descheduled scheduling-group queue (block 720). It is noted that the "descheduled scheduling-group queue" is also referred to herein as a "descheduled queue". In one implementation, the threshold is predefined. In another implementation, the threshold is programmable. If the one or more conditions indicate that resource contention is equal to or less than the first threshold (conditional block 715, "no" leg), then method 700 returns to block 705.

After block 720, the scheduler waits for a given amount of time (block 725) and then once again, the scheduler monitors the one or more conditions indicative of resource contention (block 730). If the one or more conditions indicate that resource contention is still above the first threshold (conditional block 735, "yes" leg), then the scheduler throttles the next lowest priority scheduling group (i.e., the lowest priority scheduling group remaining in the regular scheduling queues) by moving the next lowest priority scheduling group to the descheduled queue (block 740). After block 740, method 700 returns to block 725.

If the one or more conditions indicate that resource contention has fallen to below or equal to the first threshold (conditional block 735, "no" leg), then the scheduler determines if the one or more conditions indicate that resource contention is below a second threshold (conditional block 745). If the one or more conditions indicate that resource contention is below the second threshold (conditional block 745, "yes" leg), then the scheduler takes the highest priority scheduling group from the descheduled queue and puts it back in a regular scheduling queue (block 750). If the descheduled queue is empty (conditional block 755, "yes" leg), then method 700 returns to block 705. If there are still one or more scheduling groups in the descheduled queue (conditional block 755, "no" leg) or if the one or more conditions indicate that resource contention is greater than or equal to the second threshold (conditional block 745, "no" leg), then method 700 returns to block 725.

Figure 8:
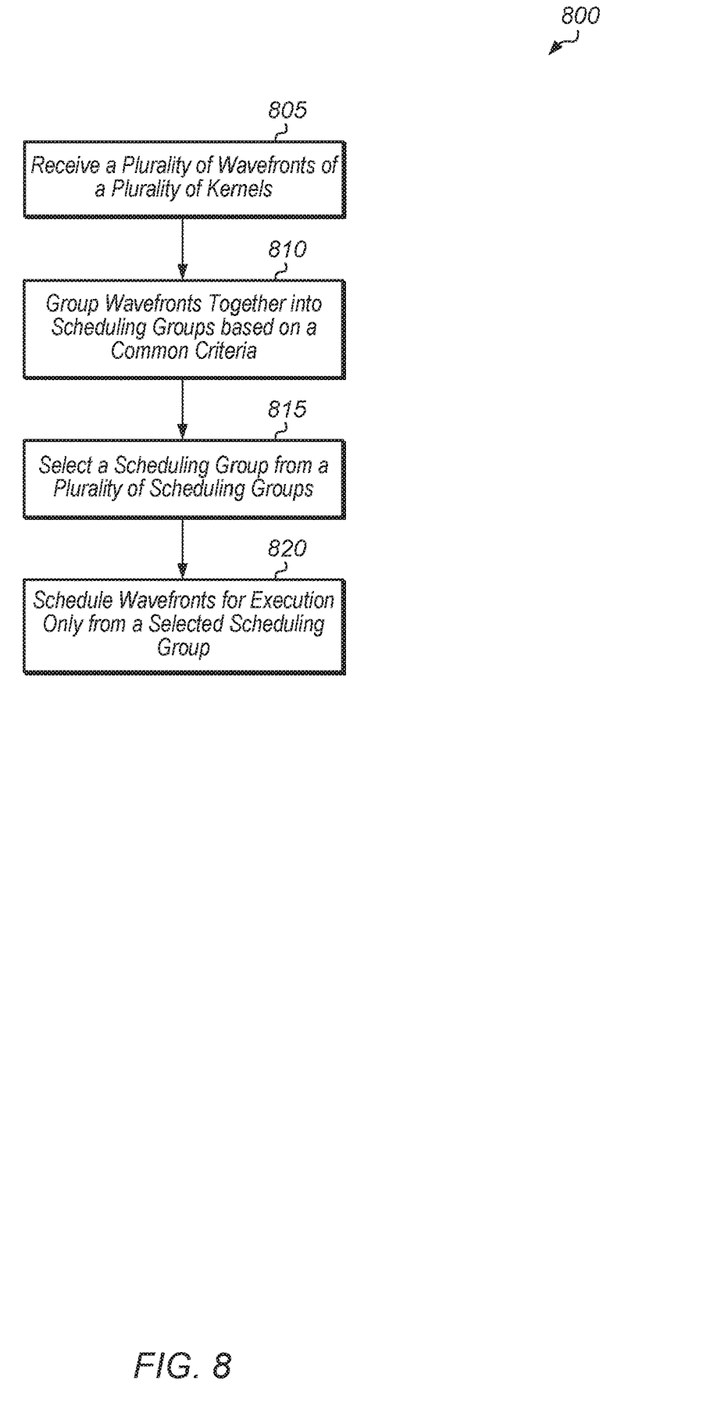
FIG. 8 is a generalized flow diagram illustrating one implementation of a method for scheduling wavefronts from multiple kernels for execution.

Turning now to FIG. 8, one implementation of a method for scheduling wavefronts from multiple kernels for execution is shown. A compute unit of a processor (e.g., a GPU) receives a plurality of wavefronts of a plurality of kernels (block 805). The compute unit groups wavefronts of the received wavefronts together into scheduling groups based at least in part on a common criteria or attribute (block 810). For example, in one implementation the criteria or attribute that is common to the wavefronts is at least one of a kernel and a priority. Next, the compute unit selects a scheduling group from a plurality of scheduling groups (block 815). Then, the compute unit schedules wavefronts for execution only from the selected scheduling group (block 820). After block 820, method 800 ends. It is noted that steps 815 and 820 of method 800 are able to be repeated after the wavefronts from a given selected scheduling group have completed.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a plurality of compute circuits; and
    a command processor coupled to the plurality of compute circuits, wherein the command processor comprises circuitry configured to dispatch kernels to the plurality of compute circuits;
    wherein each compute circuit of the plurality of compute circuits is configured to:
        receive, from the command processor, a plurality of wavefronts of a plurality of kernels;
        create and store a plurality of scheduling groups in a scheduling queue, including one or more scheduling groups that each comprise wavefronts from at least two kernels of the plurality of kernels, wherein wavefronts selected for inclusion in a scheduling group of the one or more scheduling groups are selected based on an identified priority of a corresponding kernel;
        schedule wavefronts for execution from a first scheduling group, of the plurality of scheduling groups, that has been selected for scheduling, in response to the first scheduling group having one or more wavefronts ready for execution;
        move a second scheduling group with a lowest priority that has not yet been scheduled for execution from the scheduling queue into a descheduled queue, responsive to a first measure of resource contention being greater than a first threshold, wherein each scheduling group in the descheduled queue is prevented from being scheduled for execution until said scheduling group is moved from the descheduled queue to the scheduling queue; and
        execute each wavefront from the first scheduling group in response to the scheduling.

2. The system as recited in claim 1, wherein a lower priority scheduling group in the scheduling queue is not selected for scheduling until wavefronts from scheduling groups having a higher priority than the lower priority scheduling group in the scheduling queue have completed execution.

3. The system as recited in claim 1, wherein each compute circuit is configured to:
    group wavefronts with a same priority together into a same scheduling group; and
    prevent wavefronts of scheduling groups in the scheduling queue other than the first scheduling group from being scheduled for execution until the first scheduling group has completed execution of its wavefronts from at least two kernels, in response to the first scheduling group being selected for scheduling.

4. The system as recited in claim 1, wherein each compute circuit is further configured to:
    monitor one or more conditions indicative of resource contention on the compute circuit, the one or more conditions comprising at least one of compute circuit stall cycles, cache miss rates, memory access latency, and link utilization; and
    generate the first measure of resource contention based on the one or more conditions; and
    wherein one or more scheduling groups stored in the descheduled queue comprise wavefronts from at least two kernels of the plurality of kernels.

5. The system as recited in claim 4, wherein each compute circuit is configured to:
    wait a given amount of time after moving the second scheduling group into the descheduled queue;
    generate a second measure of resource contention based on the one or more conditions; and
    move a next lowest priority scheduling group into the descheduled queue responsive to determining the second measure of resource contention is greater than the first threshold.

6. The system as recited in claim 4, wherein each compute circuit is configured to:
    wait a given amount of time after moving the second scheduling group into the descheduled queue;
    generate a second measure of resource contention based on the one or more conditions; and
    move a highest priority scheduling group out of the descheduled queue responsive to determining the second measure of resource contention is less than a second threshold.

7. The system as recited in claim 1, wherein, in further response to determining that the second scheduling group has one or more wavefronts ready for execution, each compute circuit is further configured to:
    schedule wavefronts for execution from the second scheduling group.

8. A method comprising:
    receiving, by a compute circuit of a plurality of compute circuits, a plurality of wavefronts of a plurality of kernels from a command processor;
    creating and storing, by the compute circuit, a plurality of scheduling groups in a scheduling queue including one or more scheduling groups that each comprises wavefronts from at least two kernels of the plurality of kernels, wherein wavefronts selected for inclusion in a scheduling group of the one or more scheduling groups are selected based on an identified priority of a corresponding kernel;
    scheduling wavefronts for execution from a first scheduling group, of the plurality of scheduling groups, that has been selected for scheduling, in response to the first scheduling group having one or more wavefronts ready for execution;
    moving, by the compute circuit, a second scheduling group with a lowest priority that has not yet been scheduled for execution from the scheduling queue into a descheduled queue, responsive to a first measure of resource contention being greater than a first threshold, wherein each scheduling group in the descheduled queue is prevented from being allowed to be scheduled for execution until said scheduling group is moved from the descheduled queue to the scheduling queue; and executing each wavefront from the first scheduling group in response to the scheduling.

9. The method as recited in claim 8, wherein a lower priority scheduling group in the scheduling queue is not selected for scheduling until wavefronts from scheduling groups having a higher priority than the lower priority scheduling group in the scheduling queue have completed execution.

10. The method as recited in claim 8, further comprising:
grouping wavefronts from kernels with a same priority together into a same scheduling group; and
preventing wavefronts of scheduling groups in the scheduling queue other than the first scheduling group from being scheduled for execution until the first scheduling group has completed execution of its wavefronts from at least two kernels, in response to the first scheduling group being selected for scheduling.

11. The method as recited in claim 8, further comprising:
monitoring one or more conditions indicative of resource contention on the compute circuit, the one or more conditions comprising at least one of compute circuit stall cycles, cache miss rates, memory access latency, and link utilization; and
generating the first measure of resource contention based on the one or more conditions; and
wherein one or more scheduling groups stored in the descheduled queue comprise wavefronts from at least two kernels of the plurality of kernels.

12. The method as recited in claim 11, further comprising:
waiting a given amount of time after moving the second scheduling group into the descheduled queue;
generating a second measure of resource contention based on the one or more conditions; and
moving a next lowest priority scheduling group into the descheduled queue responsive to determining the second measure of resource contention is greater than the first threshold.

13. The method as recited in claim 11, further comprising:
waiting a given amount of time after moving the second scheduling group into the descheduled queue;
generating a second measure of resource contention based on the one or more conditions; and
moving a highest priority scheduling group out of the descheduled queue responsive to determining the second measure of resource contention is less than a second threshold.

14. The method as recited in claim 8, wherein, in further response to determining that the second scheduling group has one or more wavefronts ready for execution, the method further comprises:
scheduling wavefronts for execution from the second scheduling group.

15. An apparatus comprising:
a memory; and
a processor coupled to the memory;
wherein the processor is configured to:
receive a plurality of wavefronts of a plurality of kernels;
create and store a plurality of scheduling groups in a scheduling queue, including one or more scheduling groups that each comprise wavefronts from at least two kernels of the plurality of kernels, wherein wavefronts selected for inclusion in a scheduling group of the one or more scheduling groups are selected based on an identified priority of a corresponding kernel;
select, for scheduling, a first scheduling group from the plurality of scheduling groups;
move a second scheduling group with a lowest priority that has not yet been scheduled for execution from the scheduling queue into a descheduled queue, responsive to a first measure of resource contention being greater than a first threshold, wherein each scheduling group in the descheduled queue is prevented from being scheduled for execution until said scheduling group is moved from the descheduled queue to the scheduling queue;
schedule wavefronts for execution from the first scheduling group, in response to determining that the first scheduling group has one or more wavefronts ready for execution; and
execute each wavefront from the first scheduling group in response to the scheduling.

16. The apparatus as recited in claim 15, wherein a lower priority scheduling group in the scheduling queue is not selected for scheduling until wavefronts from scheduling groups having a higher priority than the lower priority scheduling group in the scheduling queue have completed execution.

17. The apparatus as recited in claim 15, wherein the processor is configured to:
group wavefronts from kernels with a same priority together into a same scheduling group; and
prevent wavefronts of scheduling groups in the scheduling queue other than the first scheduling group from being scheduled for execution until the first scheduling group has completed execution of its wavefronts from at least two kernels, in response to the first scheduling group being selected for scheduling.

18. The apparatus as recited in claim 15, wherein the processor is further configured to:
monitor one or more conditions indicative of resource contention on the processor, the one or more conditions comprising at least one of stall cycles, cache miss rates, memory access latency, and link utilization; and
generate the first measure of resource contention based on the one or more conditions; and
wherein one or more scheduling groups stored in the descheduled queue comprise wavefronts from at least two kernels of the plurality of kernels.

19. The apparatus as recited in claim 18, wherein the processor is further configured to:
wait a given amount of time after moving the second scheduling group into the descheduled queue;
generate a second measure of resource contention based on the one or more conditions; and
move a next lowest priority scheduling group into the descheduled queue responsive to determining the second measure of resource contention is greater than the first threshold.

20. The apparatus as recited in claim 18, wherein the processor is further configured to:
wait a given amount of time after moving the second scheduling group into the descheduled queue;
generate a second measure of resource contention based on the one or more conditions; and
move a highest priority scheduling group out of the descheduled queue responsive to determining the second measure of resource contention is less than a second threshold.

* * * * *